E. Newhall,
Boot Heel.
No. 50,026. Patented Sep. 19,1865.

Witnesses
F. Gould
S. B. Kidder

Erastus Newhall
By his Atty
N. B. Crosby

UNITED STATES PATENT OFFICE.

ERASTUS NEWHALL, OF LYNN, MASSACHUSETTS.

IMPROVED BOOT-HEEL.

Specification forming part of Letters Patent No. 50,026, dated September 19, 1865.

*To all whom it may concern:*

Be it known that I, ERASTUS NEWHALL, of Lynn, in the county of Essex and State of Massachusetts, have invented Improvements in Vulcanized Heels; and I do hereby declare that the following, taken in connection with the drawings which accompany and form part of this specification, is a description of my invention sufficient to enable those skilled in the art to practice it.

My invention relates to an improvement in vulcanized molded heels, of rubber or equivalent material, for boots and shoes; and it consists in the insertion or embedment within each of such heels of a body or core of wood of such size and thickness and so located in the heel that said core will receive the nails which are driven from within a boot or shoe through its sole and into the heel, the wood therein acting to hold the nails more firmly than the rubber would do, and serving also to cheapen the cost of such heels and make them lighter in weight than they would be if made of pure rubber, or of a homogeneous mixture of rubber and fiber or granular or pulverized matter.

Figure 1:
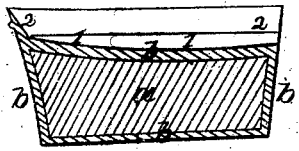
Figure 2:
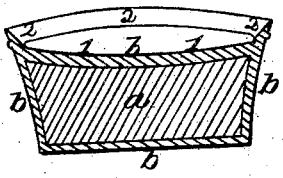

Of the drawings, Figure 1 represents one of my improved heels in longitudinal vertical section, and Fig. 2 represents a cross vertical section of the same.

The wood is represented by *a* and the rubber by *b*. A concave seat is seen at 1 1, and the flange around it is marked 2 2.

In the manufacture of heels embodying my invention pieces of wood of the desired quality as to hardness and weight are got out to the size and form required, and are placed with the rubber in the proper position in the molds in which the rubber is vulcanized, and the vulcanization is then performed in the well known way.

The amount of rubber on either side of the wood core may be varied to conform to the requirements of shoe-manufacturers—as, for example, considerable rubber may be placed beneath the wood to make an elastic, yielding tread.

Where a soft, yielding tread is not desired nails or hobs may be driven through the tread-face of the rubber into the wood, so as to lessen the wear of the heel.

I claim—

The construction of a heel for boots or shoes of vulcanized rubber or its compounds or other vulcanizable material, with a core of wood, substantially as and for the purpose specified.

In witness whereof I have hereunto set my hand this 27th day of July, A. D. 1865.

ERASTUS NEWHALL.

Witnesses:
J. B. CROSBY,
F. GOULD.